Aug. 15, 1950   P. ROSENBERG   2,518,938
SUPERSONIC TRAINING DEVICE
Filed Oct. 19, 1945   2 Sheets-Sheet 1

*INVENTOR.*
PAUL ROSENBERG
BY
William D. Hall
ATTORNEY

Aug. 15, 1950 P. ROSENBERG 2,518,938
SUPERSONIC TRAINING DEVICE
Filed Oct. 19, 1945 2 Sheets—Sheet 2

INVENTOR.
PAUL ROSENBERG
BY Harry M. Saragovitz
ATTORNEY

UNITED STATES PATENT OFFICE 2,518,938

SUPERSONIC TRAINING DEVICE

Paul Rosenberg, Brookline, Mass., assignor, by mesne assignments, to the United States of America as represented by the Secretary of War Application October 19, 1945, Serial No. 623,412

1 Claim. (Cl. 35—10.4)

This invention relates to relief maps and more particularly a supersonic trainer map in which portions of the map representing selected geographical areas are removable and replaceable.

In the copending application of Raymond L. Garman and Paul Rosenberg Serial No. 623,409, filed Oct. 19, 1945, now abandoned, there is disclosed and claimed a map that will reflect supersonic energy to a degree proportional to the degree of reflection of electromagnetic energy from corresponding areas of the earth's surface. This map is for use in supersonic trainers that simulate the operation of radio object locating systems. One type of supersonic trainer consists of a radio object locating system in which the transmitter and antenna are replaced with a supersonic crystal transducer. The crystal transducer is adapted to transmit a pulse of supersonic compressional wave energy upon receipt of a video pulse signal from the radio object locating system. The crystal transducer will also supply a video pulse signal to the radio object locating system whenever an echo of the original transmitted pulse strikes the crystal of the transducer.

The transducer is suspended by means of suitable movable arms or tracks in a liquid filled tank. The size of this tank may vary but, by way of example only, it may be four by six feet in horizontal dimension and one and one-half feet in vertical dimension. Water is a satisfactory liquid to use in the tank.

The position of the transducer in the liquid may be controlled manually or by means of suitable servo systems to simulate to scale the flight of an aircraft. A reflector or map is placed in the bottom of the tank to cause the pulses of energy transmitted by the transducer to be partially reflected along their path of propagation so that the echoes of these transmitted pulses return to the transducer. The upper surface of the reflector is treated so that the supersonic echoes from various areas of the reflector simulate the reflection of electromagnetic energy from corresponding areas on the earth's surface.

When the trainer is in operation the operator of the radio object locating system sees on his viewing screen a constantly changing radar picture that accurately simulates the radar picture that would be seen if the radio object locating system were in an aircraft flying over the represented area.

Certain types of radio object locating systems have been designed for precise bombing and navigational work and these systems have sufficient accuracy to distinguish details in a city. Such details include streets, buildings, rivers, parks and so forth.

If the operators are to be trained to recognize from an indicator screen various prominent landmarks in a city, the trainer map must contain these landmarks.

It is an object of this invention, therefore, to provide a simple novel apparatus for constructing cities on a supersonic trainer map.

It is a further object of this invention to provide apparatus for altering a map if landmarks or details of the earth's surface are changed due to bombing or other reasons.

For a better understanding of the invention together with other and further objects thereof reference is had to the following description taken in connection with the accompanying drawing in which.

Figure 1:
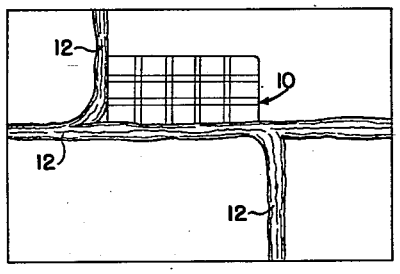
Fig. 1 is a schematic view of a portion of the earth's surface.

Referring now to Fig. 1 there is shown a portion of the surface of the earth containing a city 10. Rivers 12 are also shown but no other details are shown since the invention does not involve the representation of terrain features in the area surrounding the city.

Figure 2:
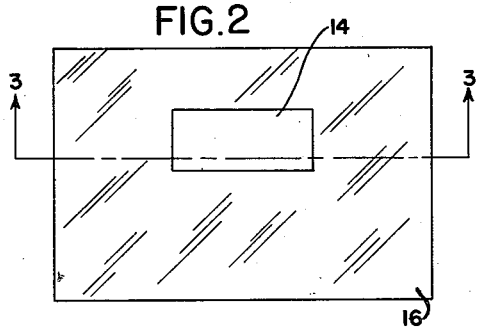
Fig. 2 is a view of a sheet of material employed in making a supersonic map.
Figure 3:
Fig. 3 is a sectional view of the sheet of Fig. 2 taken along the line 3—3.

In Figs. 2 and 3 there is illustrated a sheet of material commonly known as safety glass in which an opening 14 has been made in the glass sheet 16. No openings have been made in the plastic sheet 18 or the second glass sheet 20 which also form a part of the sheet of safety glass. The opening 14 in sheet 16 is most easily made by sandblasting the glass and the opening should be approximately the size of area representing city 10 of Fig. 1. A supersonic map of the area surrounding city 10 may be constructed on the exposed face of sheet 16 in the manner provided in the above mentioned copending application or by any other similar means. The maps described in this copending application are constructed by roughening selected areas on the surface of a smooth sheet of glass until these selected areas reflect the energy in an incident beam of supersonic energy back along the path of the beam to a degree proportional to intensity of the radar echo received from the portions of the earth's surface represented by these selected areas.

Figure 4:
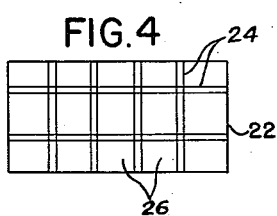
Fig. 4 is a plan view of the part of the map representing a city.
Figure 5:
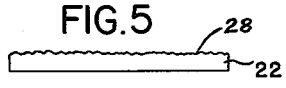
Fig. 5 is a side elevation of the portion of the map shown in Fig. 4.

A small sheet 22 of plastic or other material illustrated in Figs. 4 and 5 is cut to fit the opening 14 in sheet 16, Fig. 3. The details of city 19 including streets 24 and blocks of buildings 26 are laid out to scale on sheet 22 using the same method that is employed in constructing a large supersonic map. The details of the streets 24 and buildings 26 appear in Figure 5 as the uneven surface 28 on the upper surface of plastic sheet 22. One convenient material that may be used in constructing cities is known by the commercial name of "Scotchlite." This material consists of a single layer of small glass beads in close proximity, bonded permanently to a flexible cloth-like material and is manufactured by the Minnesota Mining and Manufacturing Company for use as a light reflecting background in signs. A sheet of this material may be fastened to sheet 22 and in areas that give little return such as roads, parks, etc., the glass beads may be removed to reduce reflection.

Figure 6:
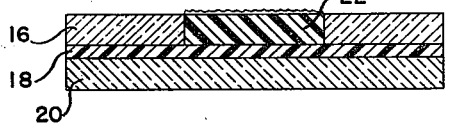
Fig. 6 is a second sectional view taken along the line 3—3 with the part of the map shown in Figs. 4 and 5 in place.

After the details of the city have been completed sheet 22 is placed in opening 14 in the manner shown in Fig. 6. Sheet 22 may be permanently fastened in place or it may be fastened in place so that it may be removed so that changes in the details of city 19 may be made from time to time. This latter method of fastening is desirable where the landmarks of a city are apt to change due to addition or destruction of structures or buildings.

Some of the advantages of this method of representing cities on a map are: one, the fine details of the city may be constructed under favorable working conditions due to the small sized sheet on which the map of the city is constructed; two, a new insert may be made when the situation demands it; third, it is a relatively simple matter to change inserts in the map; and fourth, the details of the city may be constructed so that they are flush with or even slightly below the surface of sheet 16 and thus avoid shadows in the field pattern of the trainer that might result if the map of the city was placed on the surface of sheet 16.

While the foregoing discussion has been limited to a sheet of safety glass having an opening sandblasted therein, the invention is by no means limited to the use of this material or to the use of this method for forming an opening. Solid glass, solid plastic, laminated plastic or any material that will cause specular reflection of a beam of supersonic energy may be used for the map base and the recess for the city may be formed by drilling, etching, routing or any other means well known to the shop worker.

It can be seen that more than one city may be represented on a map if desired and also that any detailed area as well as a city may be so represented. All that it is necessary to do to show more than one city is to form more openings at the proper places in the map and then prepare the proper inserts for these openings.

Figure 7:
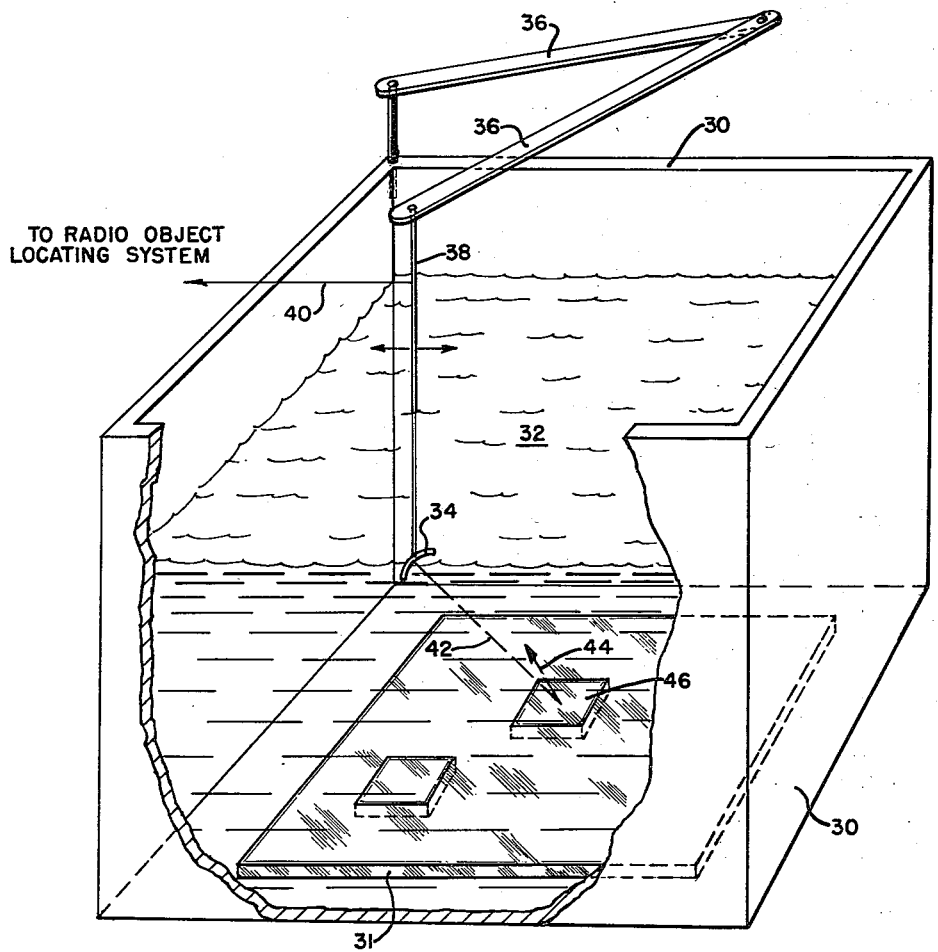
Figure 7 is a diagrammatic representation of a supersonic trainer employing a map of the type shown in Figures 1 to 6.

Figure 7 in the drawing illustrates in a diagrammatic manner a supersonic trainer of the type referred to above. The map illustrated in Figures 1 to 6 is placed on the bottom of liquid filled tank 30. This map is given the reference numeral 31 in Figure 7. As mentioned above the liquid 32 in tank 30 may be water. A crystal transducer 34 schematically illustrated in the form of its electromagnetic equivalent, a small paraboloid, is suspended beneath the surface of the liquid by means of swing arm 36 and support 38. An electrical connection 40 to transducer 34 provides means for connecting the transducer 34 to a modified radio object-locating system. (Not shown.) In Fig. 7, connection 40 is shown as terminating on support 38 but it is to be understood that the circuit is completed to transducer 34 by any means well known in the art.

Dashed line 42 in Figure 7 represents the path of transmitted supersonic energy radiated from transducer 34 and dashed line 44 represents the path of the echo reflected from the surface of map 31. A portion of this reflected energy is received by transducer 34 in the form of an echo signal.

In Figure 7 the beam is shown as being reflected from an area inclosed within a rectangle 46. Rectangle 46 represents an insert of the type shown in Figures 4 and 5 of the drawing. It is to be understood, of course, that the supersonic beam may be directed at other parts of the map 31 by changing the position of transducer 34. The operation of the trainer shown in Figure 7 will not be described in detail since a brief explanation of its operation has been given above and trainers of this general type are well known in the art. It is sufficient to state that as transducer 34 is moved over the surface of map 31 the indication appearing on the indicator of the radio object-locating system associated with this trainer is an accurate representation of the indication that would appear on the indicator if the system was located in an aircraft flying over the area of the earth's surface represented by the map. It is to be understood, of course, that applicant's novel map is not limited to use in the particular type of trainer described rather it is adaptable for use in all trainers operating on similar principles.

Therefore, while there has been described what is at present considered the preferred embodiment of the invention, it will be obvious to those skilled in the art that various changes and modifications may be made therein without departing from the invention.

What is claimed is:

A simulated airborne radar training device comprising a liquid filled tank, a map-like reflector below the liquid surface level in said tank, said reflector representing a selected portion of the earth's surface, a transducer below the liquid surface level in said tank, said transducer being laterally movable above said reflector, and adapted to simulate the movement of airborne radar, means for exciting said transducer to transmit supersonic energy for reflection from said reflector, said reflector formed with at least one opening, the upper surface of said reflector surrounding said opening being non-uniformly rough such that the reflection of electromagnetic energy from said surface to said transducer represents to scale the degree of deflection of electromagnetic energy from said selected portion of the earth's surface represented by the reflector, a removable reflector insert within said opening and flush with said upper surface, said insert representing a particular geographical area and having non-uniformly rough surfaces such that the reflection of supersonic energy from said surface to said transducer represents to scale the degree of reflection of electromagnetic energy from said geographical area, and means responsive to reception of reflected supersonic energy by said transducer.

PAUL ROSENBERG.

REFERENCES CITED

The following references are of record in the file of this patent:

UNITED STATES PATENTS

| Number | Name | Date |
|---|---|---|
| 279,268 | Norris | June 12, 1883 |
| 1,506,979 | Foulks | Sept. 2, 1924 |
| 1,902,440 | Gill | Mar. 21, 1933 |
| 2,354,048 | Palmquist | July 18, 1944 |
| 2,405,591 | Mason | Aug. 13, 1946 |